(12) United States Patent
Dozier (10) Patent No.: US 8,305,739 B2
(45) Date of Patent: Nov. 6, 2012

(54) HIGH DENSITY POWER/LIGHTING PANELBOARD

(75) Inventor: Steven W. Dozier, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 312 days.

(21) Appl. No.: 12/797,912

(22) Filed: Jun. 10, 2010

(65) Prior Publication Data

US 2011/0304958 A1 Dec. 15, 2011

(51) Int. Cl.
H02B 1/01 (2006.01)
H02B 1/20 (2006.01)
H02B 1/015 (2006.01)
H02G 3/08 (2006.01)

(52) U.S. Cl. .......... 361/627; 174/50; 361/634; 361/637; 361/639; 361/644; 361/648

(58) Field of Classification Search ................ 361/627, 361/628, 631, 634, 637, 638, 639, 641, 644, 361/649, 650
See application file for complete search history.

(56) References Cited

U.S. PATENT DOCUMENTS

| | | | | |
|---|---|---|---|---|
| 3,192,446 | A * | 6/1965 | Meacham | 361/634 |
| 4,031,433 | A * | 6/1977 | Olashaw | 361/608 |
| 4,307,304 | A * | 12/1981 | Kovatch et al. | 307/147 |
| 4,472,761 | A | 9/1984 | Koslosky et al. | 361/355 |
| 4,783,718 | A * | 11/1988 | Raabe et al. | 361/652 |
| 5,751,543 | A * | 5/1998 | Gehrs et al. | 361/641 |
| 6,061,230 | A | 5/2000 | Mazzella et al. | |
| 6,781,818 | B2 * | 8/2004 | Josten et al. | 361/611 |
| 6,870,103 | B1 | 3/2005 | Wiant et al. | |
| 2006/0082264 | A1 | 4/2006 | Packard, III et al. | 312/223.1 |

FOREIGN PATENT DOCUMENTS

CH 690880 2/2001

OTHER PUBLICATIONS

EATON: Electrical Distribution; Panelboards; POW-R-Line 3a ; 1 page, dated prior to Jun. 2010.
EATON Cutler-Hammer: Standard Specification for POW-R-Line C™ Pandelboards—Type PRL3a "Industry Standards: Cutler Hammer panelboards are designed to meet the following applicable industry standards (unless noted)." 1 page, dated Prior to Jun. 10, 2010.

(Continued)

Primary Examiner — Gregory Thompson
(74) Attorney, Agent, or Firm — Nixon Peabody LLP (57) ABSTRACT

A panelboard supplies electricity to multiple loads, such as lighting fixtures and/or other electrical devices via one or more high-amperage circuit breakers and one or more low-amperage circuit breakers. The panelboard includes one or more vertical busbars and one or more horizontal busbars coupled together in a single housing. The one or more horizontal busbars are coupled to a main input breaker that receives electricity from a source. The main input breaker distributes the electricity to the horizontal busbars. The horizontal busbars distribute the electricity to the high-amperage circuit breakers coupled thereto and to the vertical busbars. The vertical busbars distribute the electricity to the low-amperage circuit breakers coupled thereto.

20 Claims, 5 Drawing Sheets

OTHER PUBLICATIONS

Square D—Schneider Electric: Integrated Power Center "An electrical distribution system can be customized to meet your specific requirements." 4 pages, dated 2001.
Square D—Schneider Electric: Integrated Power Center 2 (IPC2™) "Space saving designs that save time and reduce costs." 8 pages, dated 2007.
Siemens—Type P3: Lighting and Power Distribution Panelboards; Overview—P3 Panelboards, 4pages, dated 2007.
Siemens—Panelboards P1 thru P5: Answers for Industry "Selection and Application Guide." 80 pages, dated 2009.
International Search Report mailed Feb. 9, 2012 issued in corresponding International Patent Application No. PCT/US2011/037108 (4 pages).
Written Opinion mailed Feb. 9, 2012 issued in corresponding International Patent Application No. PCT/US2011/037108 (5 pages).

* cited by examiner

HIGH DENSITY POWER/LIGHTING PANELBOARD

FIELD OF THE INVENTION

The present invention relates generally to electrical equipment and, more particularly, to electrical enclosures having vertical and horizontal feeder bars.

BACKGROUND OF THE INVENTION

Electrical enclosures, such as, for example, load centers or panelboards, typically house multiple circuit breakers and/or related electrical accessories. Panelboards typically include one main vertical feeder bar or busbar per phase of electricity to be distributed to a protected load. Panelboards include an outer housing that limits the space available for installing circuit breakers. Additionally, regulations restrict a circuit breaker's handle height from being above a prescribed height within a panelboard. Such a regulation further limits the space available for installing circuit breakers in a panelboard having a vertical busbar configuration, as the busbars can only be vertically extended to the prescribed height. Thus, panelboards typically include the same-sized circuit breakers having the same ampacity to maximize the number of circuit breakers that a panelboard can accommodate, as the circuit breakers are typically installed side-by-side along the vertical busbar(s).

Some prior art panelboards include two or more panelboards coupled together side-by-side to provide a product having an increased capacity for a variety of different sized circuit breakers. One such product is, for example, an Integrated Power Center, provided by Schneider Electric USA Inc., which includes two or more separate housings containing differently rated circuit breakers. One of the housings includes a power panel for receiving an electrical input and a second one of the housings includes, for example, a lighting panel. The power panel is electrically coupled to the lighting panel through wires transitioning between the two housings. The two housings can be bulky and require a significant amount of space and installation time on, for example, a construction site. Moreover, much of the space can be wasted inside the housing, particularly in installations in which only a few circuit breakers are needed to protect multiple branch circuits.

Thus, a need exists for an improved apparatus. The present invention is directed to satisfying one or more of these needs and solving other problems.

SUMMARY OF THE INVENTION

The present disclosure is directed to a high density power and lighting panelboard or load center. The panelboard supplies electricity to multiple loads, such as lighting fixtures and/or other electrical devices. The panelboard includes one or more vertical busbars and one or more horizontal busbars coupled together in a single housing to maximize low-amperage and high-amperage circuit breaker capacities within the single housing. The one or more horizontal busbars are coupled to a main input breaker that receives electricity from a source, such as a power utility and/or a power generator. The main input breaker distributes electricity to the horizontal busbars. The horizontal busbars distribute the electricity to high-amperage circuit breakers coupled thereto and to the vertical busbars. The vertical busbars distribute electricity to low-amperage circuit breakers coupled thereto.

The orientation and design of the disclosed panelboard allows for an expanded ampacity range of circuit breakers in a single housing as compared with the prior products having multiple housings. For example, circuit breakers having an ampere rating between 10 amps and 1200 amps can be installed into a single housing panelboard according to the aspects of the present disclosure.

Distributing electricity from the main input breaker to the horizontal busbars coupled to the high-amperage circuit breakers and then to the vertical busbars coupled to the low-amperage circuit breakers allows for circuit breakers having higher ampere ratings to be installed in the panelboard of the present disclosure as compared to prior panelboards. The disclosed panelboard design sheds most of the higher current loads prior to reaching the vertical busbars coupled to the low-amperage circuit breakers. Additionally, the orientation and design of the disclosed panelboard allows for smaller vertical busbars to be implemented as the loads distributed therethrough are limited based on the low-amperage circuit breakers coupled thereto. Such smaller vertical busbars translates into less material being used, which can result in a savings in material costs, such as expensive copper typically used to fabricate busbars.

One or more additional sets of vertical busbars can be coupled to the horizontal busbars to expand the panelboard's capacity for low-amperage circuit breakers. Such a design accommodates regulations limiting circuit breaker handle height in a panelboard.

One or more secondary input breakers can be coupled to the horizontal busbars to distribute backup power through the panelboard. For example, the main input breaker can receive electricity from a power utility company and the secondary input breaker can receive electricity from a local power generator.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
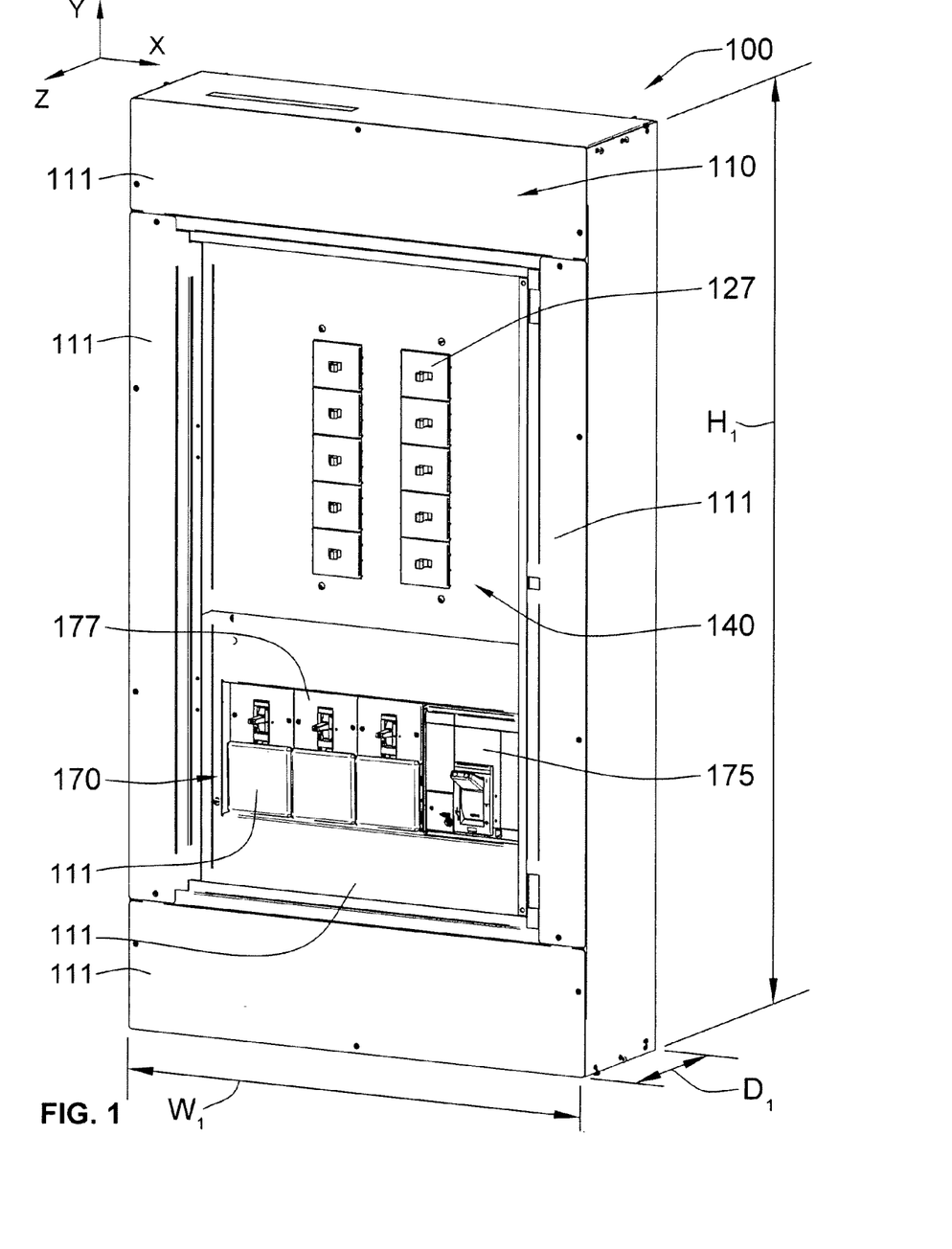
FIG. 1 is a perspective view of a panelboard according to some aspects of the present disclosure.

Referring to FIG. 1, an electrical enclosure or a panelboard 100 is shown according to the present disclosure. The panelboard 100 includes a housing 110. The housing 110 can be made of a variety of materials including metal, plastic, fiberglass, and the like. The housing 110 can include a hinged door (not shown) or other means of sealing and/or covering all of or some of the contents of the panelboard 100, such as, for example, one or more lid panels 111.

The housing 110 has a width $W_1$ between 10 inches and 100 inches, more preferably between 30 inches and 50 inches. The housing 110 has a height $H_1$ between 45 inches and 130 inches, more preferably between 70 inches and 90 inches. The housing 110 has a depth $D_1$ between 7 inches and 15 inches, more preferably between 9 inches and 10 inches.

The housing 110 includes a low-amperage section 140 and a high-amperage section 170. The low-amperage section 140 is configured to receive only low-amperage circuit breakers 127 such as circuit breakers having an ampere rating of about 10 amps to about 100 amps. The low-amperage circuit breakers 127 are of the type typically used for supplying power to electrical loads such as lighting fixtures. The high-amperage section 170 is configured to receive only high-amperage circuit breakers 177 such as circuit breakers having an ampere rating of about 100 amps to about 1200 amps. The high-amperage circuit breakers 177 are of the type typically used for supplying power to large electrical loads such as HVAC loads, motor loads, and other down stream electrical panel loads.

The high-amperage section 170 is further configured to include a main input breaker 175 configured to receive three phases of electricity from a source, such as, for example, a power utility or a generator. A ratio of an ampere rating of the high-amperage circuit breakers 177 to an ampere rating of the low-amperage circuit breakers 127 is at least about 2 to 1. Other ratios of the ampere rating of the high-amperage circuit breakers 177 to the ampere rating of the low-amperage circuit breakers 127 are contemplated, such as, for example, a ratio of at least about 4 to 1, a ratio of at least about 8 to 1, a ratio of at least about 10 to 1, and a ratio of at least about 80 to 1.

Figure 2:
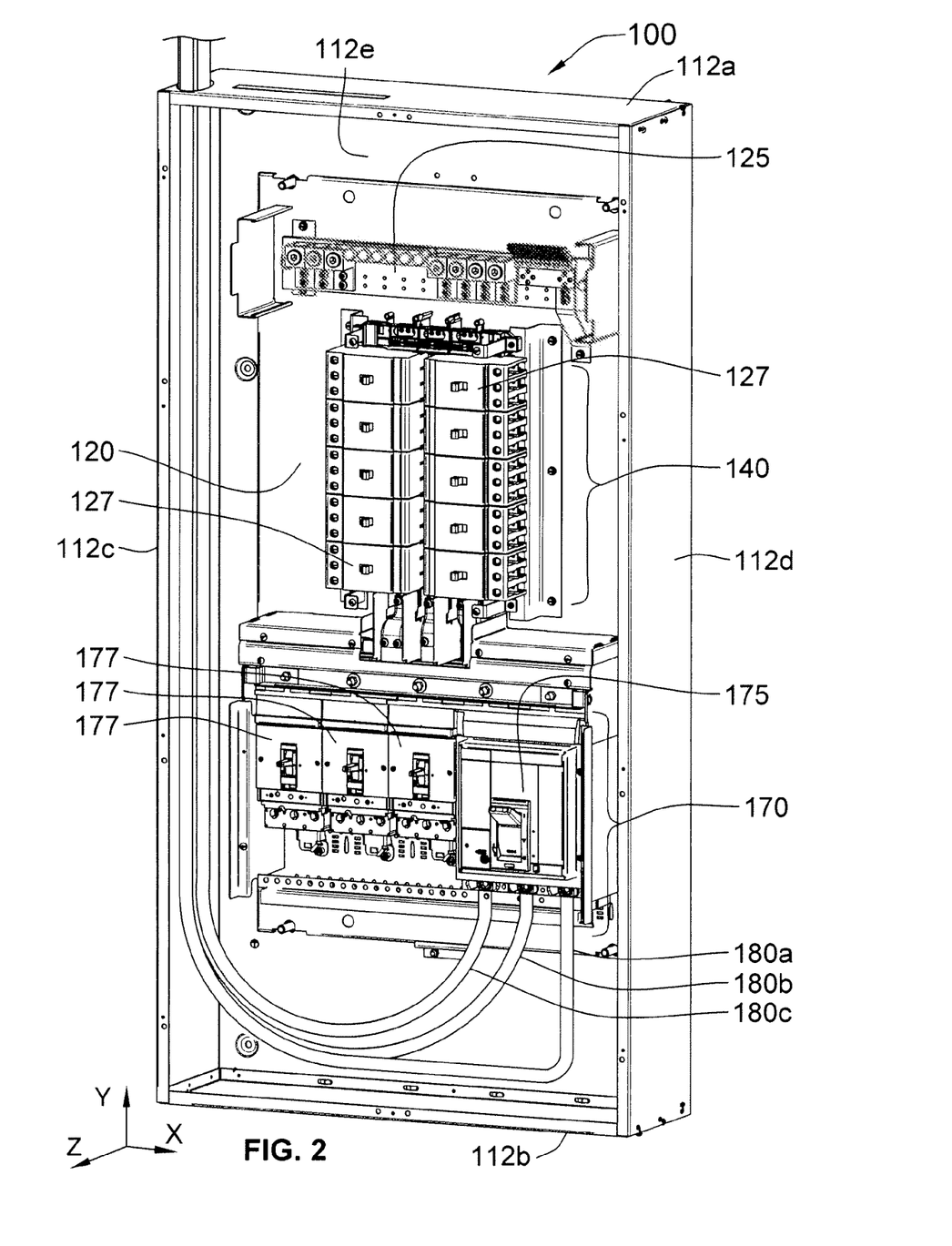
FIG. 2 is a partial perspective view of the panelboard of FIG. 1 having a portion of its housing removed to better illustrate a breaker mounting pan.

Referring to FIG. 2, the panelboard 100 is shown with the lid panels 111 removed to illustrate an interior of the panelboard 100. In addition to the lid panels 111, the housing 110 of the panelboard 100 includes a top panel 112a, a bottom panel 112b, a left panel 112c, a right panel 112d, and a base panel 112e. The panels 111, 112a-e can be separate and distinct parts coupled together or portions of a single piece of material folded and/or bent into shape. The housing 110 can include an insulating pad (not shown) that covers all of or a portion of an interior surface of the housing 110 by being affixed to one or more of the panels 111, 112a-e. The insulating pad is configured to electrically insulate the contents of the panelboard 100 from electrically conductive items outside the housing 110 (e.g., metal wall studs, screws, wires, etc.).

Figure 3:
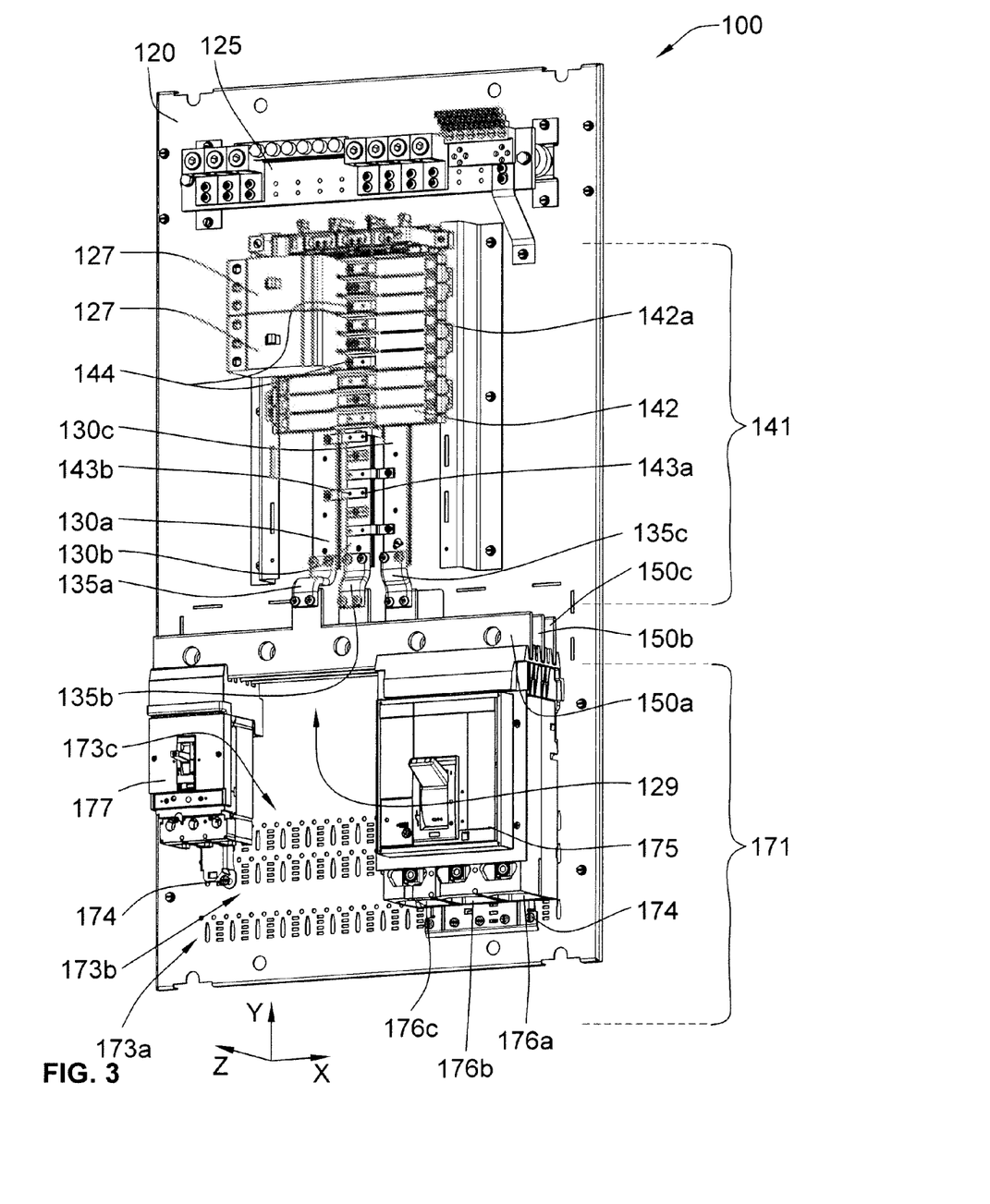
FIG. 3 is a perspective view of the breaker mounting pan of the panelboard of FIGS. 1 and 2 coupled to a busbar assembly.

Referring to FIGS. 2 and 3, the panelboard 100 includes a breaker mounting pan 120. The breaker mounting pan 120 is coupled to the base 112e of the housing 110. Alternatively or additionally, the breaker mounting pan 120 is coupled to the insulating pad (not shown). FIG. 3 is a perspective view of the breaker mounting pan 120 removed from the housing 110. The breaker mounting pan 120 includes a low-amperage section 141 and a high-amperage section 171. The low-amperage section 141 of the breaker mounting pan 120 corresponds with the low-amperage section 140 of the housing 110 and the high-amperage section 171 of the breaker mounting pan 120 corresponds with the high-amperage section 170 of the housing 110. That is, the low-amperage section 141 of the breaker mounting pan 120 is positioned in the low-amperage section 140 of the housing 110 and the high-amperage section 171 of the breaker mounting pan 120 is positioned in the high-amperage section 170 of the housing 110.

Figure 4:
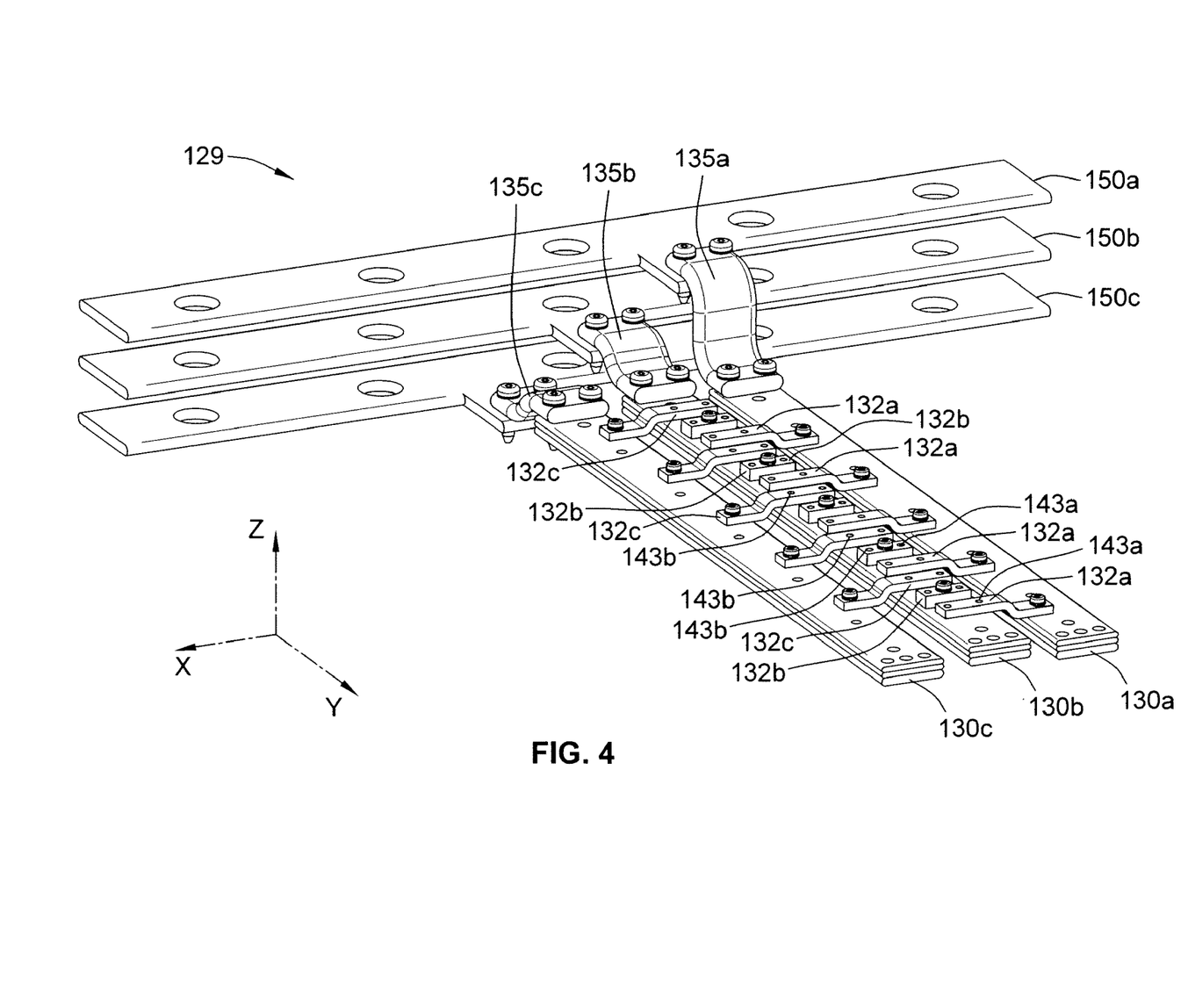
FIG. 4 is a perspective view of the busbar assembly of the panelboard of FIGS. 1 and 2.

As shown in FIG. 3, a busbar assembly 129 is mounted to the breaker mounting pan 120 for distributing three phases of electricity. The busbar assembly 129 is completely located within the housing 110. FIG. 4 is an enlarged perspective view of the busbar assembly 129. As shown in FIG. 4, the busbar assembly 129 includes three vertical busbars 130a-c coupled to three horizontal busbars 150a-c. Specifically, a first horizontal busbar 150a is electrically coupled to a first vertical busbar 130a by a first jumper bar 135a and generally perpendicular to the first vertical busbar 130a. Similarly, a second horizontal busbar 150b is electrically coupled to a second vertical busbar 130b by a second jumper bar 135b and generally perpendicular to the second vertical busbar 130b; and a third horizontal busbar 150c is electrically coupled to a third vertical busbar 130c by a third jumper bar 135c and generally perpendicular to the third vertical busbar 130c.

The vertical and horizontal busbars 130a-c, 150a-c are formed from any electrically conducting material, as is known in the art, such as copper. The vertical busbars 130a-c are positioned within the housing 110 such that each of the vertical busbars 130a-c is electrically insulated from the housing 110 and from each other. Similarly, the horizontal busbars 150a-c are positioned within the housing 110 such that each of the horizontal busbars 150a-c is electrically insulated from the housing 110 and from each other.

The first, second, and third jumper bars 135a-c can be integral with, or attached to, one end of a respective one of the vertical busbars 130a-c. The first, second, and third jumper bars 135a-c can also be integral with, or attached to, a portion of a respective one of the horizontal busbars 150a-c. The first, second, and third jumper bars 135a-c can be attached to the respective vertical and horizontal busbars 130a-c,150a-c via one or more plug-ons, screws, one or more welds, one or more rivets, one or more nuts and bolts, or similar fastener(s). For example, the first jumper bar 135a can be coupled with one or more screws to the first vertical busbar 130a and/or the first horizontal busbar 150a such that the first vertical busbar 130a and the first horizontal busbar 150a are electrically coupled.

The three vertical busbars 130a-c are positioned completely within the low-amperage section 140 of the housing 110 and the three horizontal busbars 150a-c are positioned completely within the high-amperage section 170 of the housing 110. The three jumper bars 135a-c are partially positioned in the low-amperage section 140 of the housing 110 and partially in the high-amperage section 170 of the housing 110, as the three jumper bars 135a-c span a line between the two sections 140, 170.

The first vertical and horizontal busbars 130a, 150a are configured to distribute a first phase of electricity in the panelboard 100. Similarly, the second vertical and horizontal busbars 130b, 150b are configured to distribute a second phase of electricity in the panelboard 100 and the third vertical and horizontal busbars 130c, 150c are configured to distribute a third phase of electricity in the panelboard 100. That is, each of vertical busbars 130a-c is configured to supply a separate and distinct phase of electricity to one or more low-amperage circuit breakers 127 and each of horizontal busbars 150a-c is configured to supply a separate and distinct phase of electricity to one or more high-amperage circuit breakers 177.

The three vertical busbars 130a-c are generally parallel to a Y-axis, as indicated and are generally vertical relative to earth. The three horizontal busbars 150a-c are generally parallel to an X-axis and are generally horizontal relative to earth. As shown in FIGS. 2 and 3, the main input breaker 175 and each of the high-amperage circuit breakers 177 have a longest axis and two shorter axes. The longest axis for the main input breaker 175 and the longest axis for each of the high-amperage circuit breakers 177 are generally parallel to the Y-axis. Similarly, a first one of the two shorter axes is generally parallel to the X-axis and a second one of the two shorter axes are generally parallel to a Z-axis. The main input breaker 175 and each of the high-amperage circuit breakers 177 also have two parallel major surfaces and two pairs of parallel minor surfaces, where each of the respective six surfaces defines a housing for the main input breaker 175 and for each of the high-amperage circuit breakers 177. The two parallel major surfaces are generally parallel to the longest axis and the Y-axis. Similarly, a first one of the two pairs of parallel minor surfaces is generally parallel a first one of the two shorter axes and the X-axis and a second one of the two pairs of parallel minor surfaces is generally parallel a second one of the two shorter axes and the Z-axis.

Referring also to FIG. 4, the busbar assembly 129 includes three sets of stabs 132a-c. A first set of stabs 132a is coupled to the first vertical busbar 130a. Similarly, a second set of stabs 132b is coupled to the second vertical busbar 130b and a third set of stabs 132c is coupled to the third vertical busbar 130c. Each set of stabs 132a-c is positioned to be electrically and physically coupled with low-amperage circuit breakers 127 in the low-amperage section 140 of the housing 110 to distribute a respective phase of electricity. Specifically, the first set of stabs 132a is coupled to the first vertical busbar 130a to distribute the first phase of electricity to low-amperage circuit breakers 127 connected thereto. Similarly, the second set of stabs 132b is coupled to the second vertical busbar 130b to distribute the second phase of electricity to low-amperage circuit breakers 127 connected thereto and the third set of stabs 132c is coupled to the third vertical busbar 130c to distribute the third phase of electricity to low-amperage circuit breakers 127 connected thereto.

Each one of the stabs includes a first circuit breaker attachment point 143a and a second circuit breaker attachment point 143b. The first and second circuit breaker attachment points 143a and 143b are apertures or grooves. The first and the second circuit breaker attachment points 143a and 143b are configured to receive a first type of fasteners 144, such as, for example, screws as shown in FIG. 3, to removably secure low-amperage circuit breakers 127 in the low-amperage section 140 of the housing 110, as shown in FIGS. 1-3. The first circuit breaker attachment point 143a of each of the stabs collectively forms a first plurality of low-amperage attachment points 143a that is positioned along a first side of the second vertical busbar 130b. Similarly, the second circuit breaker attachment point 143b of each of the stabs collectively forms a second plurality of low-amperage attachment points 143b that is positioned along a second opposing side of the second vertical busbar 130b.

Referring back to FIG. 2, ten of the low-amperage circuit breakers 127 are positioned in the low-amperage section 140 of the housing 110. Additionally, the main input breaker 175 and three of the high-amperage circuit breakers 177 are positioned in the high-amperage section 170 of the housing 110. Specifically, the main input breaker 175 and the three high-amperage circuit breakers 177 are physically coupled to the high-amperage section 171 of the breaker mounting pan 120.

As shown in FIG. 3, the high-amperage section 171 of the circuit breaker mounting pan 120 includes a first set of high-amperage circuit breaker attachment points 173a, a second set of high-amperage circuit breaker attachment points 173b, and a third set of high-amperage circuit breaker attachment points 173c. Each set of high-amperage circuit breaker attachment points 173a-c includes a plurality of slots, apertures, and/or grooves that is configured to receive a second type of fasteners 174, such as, for example, screws as shown in FIG. 3, to removably secure the main input breaker 175 and/or the high-amperage circuit breakers 177 in the high-amperage section 170 of the housing 110. The first set of high-amperage circuit breaker attachment points 173a is positioned farthest from the three horizontal busbars 150a-c to provide ample space for removably coupling the main input breaker 175 and/or a first type of high-amperage circuit breakers (e.g., 600-1200 amp circuit breakers) to the high-amperage section 171 of the breaker mounting pan 120. The second and third sets of high-amperage circuit breaker attachment points 173b,c are positioned closer to the three horizontal busbars 150a-c than the first set of high-amperage circuit breaker attachment points 173a to couple a second type of high-amperage circuit breakers (e.g., 100-400 amp circuit breakers) to the high-amperage section 171 of the breaker mounting pan 120. Additional or fewer sets of high-amperage circuit breaker attachment points are contemplated (e.g., 2 or 4 sets).

As shown in FIG. 3, a plurality of low-amperage circuit breaker mounting brackets 142 are positioned adjacent to the three vertical busbars 130a-c. Some of the low-amperage circuit breaker mounting brackets 142 have been removed from a lower portion of the three vertical busbars 130a-c for illustrative purposes. The low-amperage circuit breaker mounting brackets 142 generally provide a mounting surface or platform for the low-amperage circuit breakers 127. The low-amperage circuit breaker mounting brackets 142 also aid in insulating the three vertical busbars 130a-c from each other. Each one of the low-amperage circuit breaker mounting brackets 142 includes a clip or rail 142a for engaging and/or receiving a low-amperage circuit breaker 127. Each one of the low-amperage circuit breaker mounting brackets 142 further includes a central aperture for providing access to the stabs 132a-c such that the circuit breakers 127 can be physically and electrically coupled to the stabs 132a-c via the first type of fasteners 144. When installing, for example, a three-phase low-amperage circuit breaker 127, a first end of the circuit breaker 127 is engaged with three adjacent clips 142a and then rotated or rocked down such that a second opposing end of the circuit breaker 127 is adjacent to three of the low-amperage attachment points 143. An installer and/or fabricator can then removably couple the circuit breaker 127 by installing three of the first type of fasteners 144, which aid in electrically coupling the three-phase low-amperage circuit breaker 127 to the three vertical busbars 130a-c, respectively.

The main input breaker 175 includes a first connector 176a, a second connector 176b, and a third connector 176c. Each of the connectors 176a-c is configured to receive and physically couple to a respective electrical wire 180a-c distributing a respective phase of electricity from a power source. For example, the first connector 176a is configured to couple to a first electrical wire 180a to receive the first phase of electricity. Similarly, the second connector 176b is configured to couple to a second electrical wire 180b to receive the second phase of electricity and the third connector 176c is configured to couple to a third electrical wire 180c to receive the third phase of electricity. The main input breaker 175 is electrically coupled to each of the three horizontal busbars 150a-c such that (1) the first phase of electricity is distributed from the first electrical wire 180a through the first connector 176a to the first horizontal busbar 150a, (2) the second phase of electricity is distributed from the second electrical wire 180b through the second connector 176b to the second horizontal busbar 150b, and (3) the third phase of electricity is distributed from the third electrical wire 180c through the third connector 176c to the third horizontal busbar 150c in response to the main input breaker 175 being in an ON position. Likewise, the first, second, and third phases of electricity are not distributed to the first, the second, and the third horizontal busbars, respectively, in response to the main input breaker 175 being in an OFF position.

As shown in FIGS. 1 and 2, the main input breaker 175 is positioned a sufficient distance from the bottom panel 112b of the housing 110 to provide ample room to bend the electrical wires 180a-c distributing the three phases of electricity in the housing 110 to reach the main input breaker 175.

In addition to the main input breaker 175, the high-amperage portion 170 of the housing 110 can further include one or more secondary input breakers (not shown) to receive incoming power from a secondary power source, such as, for example, a power generator. The secondary input breaker can be coupled to the high-amperage section 171 of the breaker mounting pan 120 in the same, or similar, manner as the main input breaker 175. The secondary input breaker includes three secondary connectors configured to receive and physically couple to a respective electrical wire (not shown) distributing a respective one of the three phases of electricity. Like the main input breaker 175, the secondary input breaker (not shown) is electrically coupled to each of the three horizontal busbars 150a-c such that (1) the first phase of electricity is distributed from a first secondary connector to the first horizontal busbar 150a, (2) the second phase of electricity is distributed from a second secondary connector to the second horizontal busbar 150b, and (3) the third phase of electricity is distributed from a third secondary connector to the third horizontal busbar 150c in response to the secondary input breaker being in an ON position. Likewise, the first, second, and third phases of electricity are not distributed to the first, the second, and the third horizontal busbars, respectively, via the secondary input breaker in response to the secondary input breaker being in an OFF position.

The secondary input breaker can be configured to be a backup to the main input breaker. For example, in response to the main input breaker 175 switching from the ON position to the OFF position, the secondary input breaker can be configured to switch automatically from the OFF position to the ON position to distribute a constant flow of electricity from a secondary source, such as a generator. Such a configuration can be useful in many situations that require a continuous flow of electricity, even under primary power failure, such as, for example, in a hospital.

A neutral bus 125 can be coupled to the breaker mounting pan 120 to provide a connection for neutral wires (not shown) if needed in a particular application. Alternatively, the neutral bus 125 is not provided in the panelboard 100, which can make room in the housing 110 for additional circuit breakers, such as, for example, additional low-amperage circuit breakers coupled to extended vertical busbars in the housing 110.

Figure 5:
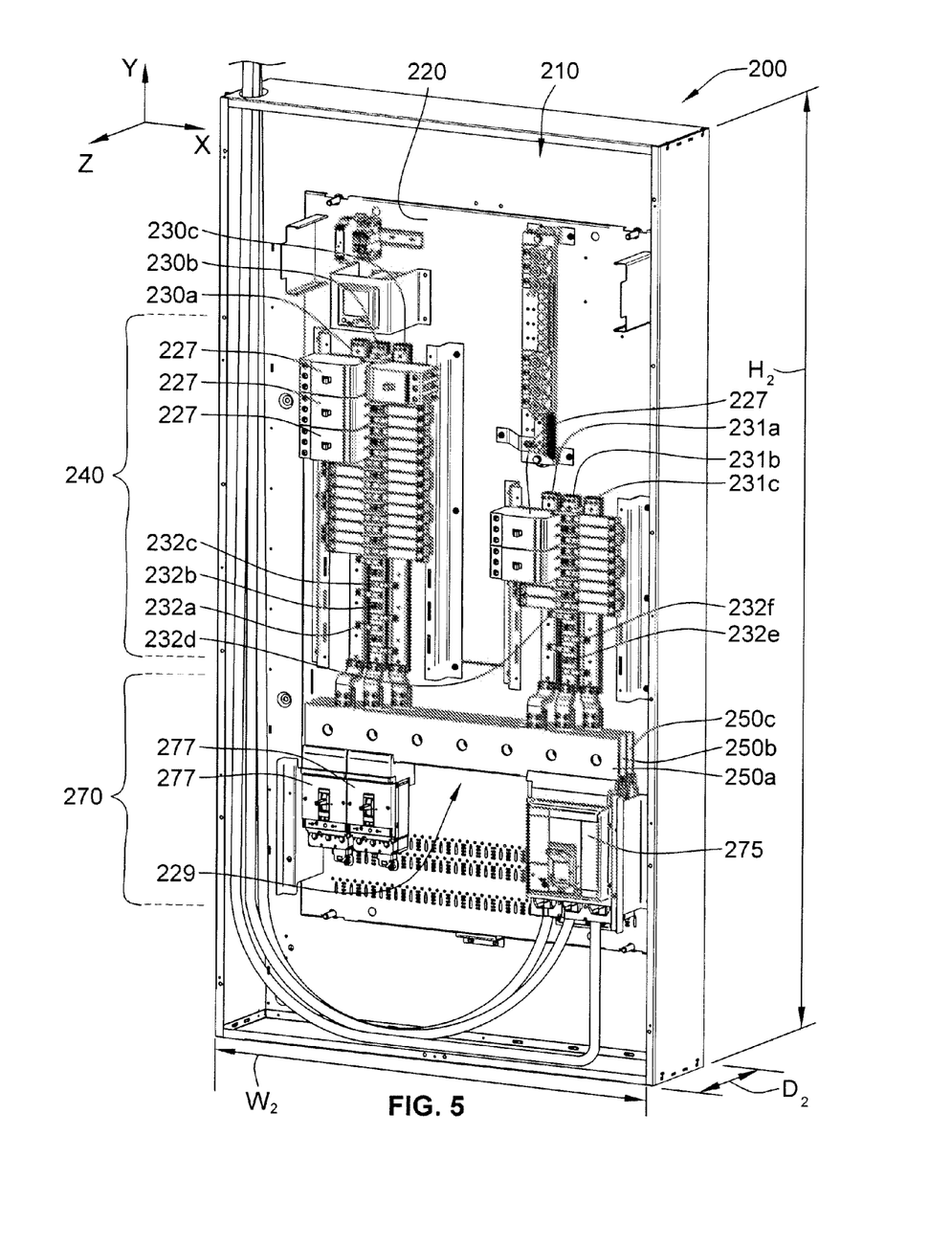
FIG. 5 is a partial perspective view of a panelboard according to some aspects of the present disclosure.

Referring to FIG. 5, a partial perspective view of a breaker mounting pan 220 and housing 210 of a dual vertical stack panelboard 200 is shown. The panelboard 200 is similar to the panelboard 100. A main difference between the panelboard 100 and the panelboard 200 is that a busbar assembly 229 of the panelboard 200 includes a second set of vertical busbars 231a-c in addition to a first set of vertical busbars 230a-c. The first and second sets of vertical busbars 230a-c, 231a-c are coupled to a set of horizontal busbars 250a-c in the same, or similar, manner as the vertical busbars 130a-c are coupled to the horizontal busbars 150a-c in the panelboard 100. The second set of vertical busbars 231a-c are laterally offset from and generally parallel to the first set of vertical busbars 230a-c. The second set of vertical busbars 231a-c are positioned completely within the housing 210 of the panelboard 200.

The second set of vertical busbars 231a-c in the panelboard 200 provides additional connection sites for low-amperage circuit breakers 227. As compared to the panelboard 100, the panelboard 200 can include up to two times the number of low-amperage circuit breakers 227 without increasing a height $H_2$, a depth $D_2$, or a width $W_2$ of the panelboard 200 to accommodate the additional circuit breakers. That is, the height $H_2$, depth $D_2$, and the width $W_2$ of the panelboard 200 can be the same as the height $H_1$, the depth $D_1$, and the width $W_1$ of the panelboard 100.

The busbar assembly 229 includes six sets of stabs 232a-f. A first set of stabs 232a is coupled to a first one of the first set of vertical busbars 230a. Similarly, a second set of stabs 232b is coupled to a second one of the first set of vertical busbars 230b and a third set of stabs 232c is coupled to a third one of the first set of vertical busbars 230c. A fourth set of stabs 232d is coupled to a first one of the second set of vertical busbars 231a. Similarly, a fifth set of stabs 232e is coupled to a second one of the second set of vertical busbars 231b and a sixth set of stabs 232f is coupled to a third one of the second set of vertical busbars 231c.

Each set of stabs 232a-f is positioned to be electrically and physically coupled with low-amperage circuit breakers 227 in a low-amperage section 240 of the housing 210 to distribute a respective phase of electricity. Specifically for the first set of vertical busbars 230a-c, the first set of stabs 232a is coupled to the first vertical busbar 230a to distribute the first phase of electricity to low-amperage circuit breakers 227 connected thereto, the second set of stabs 232b is coupled to the second vertical busbar 230b to distribute the second phase of electricity to low-amperage circuit breakers 227 connected thereto, and the third set of stabs 232c is coupled to the third vertical busbar 230c to distribute the third phase of electricity to low-amperage circuit breakers 227 connected thereto. Similarly, for the second set of vertical busbars 231a-c, the fourth set of stabs 232d is coupled to the first vertical busbar 231a to distribute the first phase of electricity to low-amperage circuit breakers 227 connected thereto, the fifth set of stabs 232e is coupled to the second vertical busbar 231b to distribute the second phase of electricity to low-amperage circuit breakers 227 connected thereto, and the sixth set of stabs 232f is coupled to the third vertical busbar 231c to distribute the third phase of electricity to low-amperage circuit breakers 227 connected thereto.

Each one of the stabs includes a first circuit breaker attachment point and a second circuit breaker attachment point, which are the same as, or similar to, the circuit breaker attachment points 143a,b described herein and shown in FIGS. 3 and 4. The low-amperage circuit breakers 227 are coupled to the attachment points in the same, or similar, manner as described in reference to the panelboard 100.

The housing 210 of the panelboard 200 includes a high-amperage section 270, which is the same as, or similar to, the high-amperage section 170 of the housing 110 of the panelboard 100. The panelboard 200 includes a main input breaker 275 and a plurality of high-amperage circuit breakers 277 in a similar manner as panelboard 100.

While specific numbers of vertical and horizontal busbars 130a-c, 230a-c, 231a-c, and 150a-c, 250a-c are described herein and shown in the Figures, it is contemplated that the panelboards 100, 200 can include any number of busbars 130a-c, 230a-c, 231a-c, and 150a-c, 250a-c. For example, in some embodiments, the panelboard 100 is a single-phase panelboard that includes only one vertical busbar 130a and one horizontal busbar 150a. For another example, the panelboard 100 is a dual-phase panelboard that includes two vertical busbars 130a,b and two horizontal busbars 150a,b. For another example, the panelboard 200 is a single-phase panelboard that includes two vertical busbars 230a and 231a and one horizontal busbar 250a.

While specific types and numbers of low-amperage and high-amperage circuit breakers 127/227, 177/277 are positioned in the low-amperage section 140/240 and the high-amperage section 170/270 of the housing 110/210, respectively, it is contemplated various numbers and types of low-amperage and high-amperage circuit breakers can be positioned in the low-amperage section 140/240 and the high-amperage section 170/270 of the housing 110/210, respectively. For example, in addition to or in lieu of the three-phase circuit breakers shown in FIGS. 1-3 and 5, the panelboards 100, 200 can include single-phase and/or dual-phase circuit breakers. For another example, in addition to the main input breaker 175, a 600-1200 amp circuit breaker and a 225 amp circuit breaker can be positioned in the high-amperage section 170 of the housing 110. For another example, the low-amperage section 140 of the housing can include five three-phase circuit breakers having an ampere rating of 15 amps and 15 single phase circuit breakers having an ampere rating of 20 amps. For another example, the high-amperage section 270 of the housing 210 can include the main-input breaker 275, a secondary input breaker, and a 800 amp circuit breaker.

While the X-axis is generally parallel relative to earth and the Y-axis is generally perpendicular to earth, it is contemplated that the X and Y axes can be rotated in unison or separately relative to earth such that the vertical busbars 130a-c, 230a-c, 231a-c are not vertical relative to earth, the horizontal busbars 150a-c, 250a-c are not horizontal relative to earth, or any combination. For example, the vertical busbars 130a-c can be rotated 30 degrees to the right or left.

While the attachment points are shown as apertures and slots respectively, it is contemplated that any one of the attachment points can be a rail, a slot, an aperture, a weldable surface, a clip, a connector, a groove, or a combination thereof. For example, instead of the attachment points 143a,b being apertures or grooves, each of the attachment points 143a,b can be a respective connector that is configured to receive a jaw member of a circuit breaker to electrically and physically couple the circuit breaker with a respective one of the vertical busbars 130a-c.

While the dual stack panelboard 200 is shown as having two sets of vertical busbars 230a-c and 231a-c, it is contemplated that any number of sets of vertical busbars can be coupled to the horizontal busbars 250a-c. For example, three sets of vertical busbars can be coupled to the horizontal busbars 250a-c. In such a configuration, it is contemplated that the horizontal busbars are longer than the horizontal busbars 150a-c, 250a-c to provide space for coupling to the third set of vertical busbars. Additionally, it is contemplated that a width of the housing of such a panelboard is larger than the widths $W_1$ and $W_2$ of the panelboards 100, 200.

It is contemplated that instead of including the main input breaker 175, the panelboard 100 can include one or more main lugs configured to couple with the electrical wires 180a-c.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A panelboard, comprising:
a housing having a low-amperage section and a high-amperage section, the low-amperage section being configured to receive only low-amperage circuit breakers having an ampere rating between about 10 and 100 amps, the high-amperage section being configured to receive only high-amperage circuit breakers having an ampere rating between about 100 and 1200 amps;
a first vertical busbar, positioned completely within the low-amperage section of the housing, for distributing a first phase of electricity entering the panelboard to a first plurality of low-amperage circuit breakers capable of being coupled to the first vertical busbar; and
a horizontal busbar, positioned completely within the housing, for distributing the first phase of electricity to a plurality of high-amperage circuit breakers capable of being coupled to the horizontal busbar in the high-amperage section of the housing, the horizontal busbar being electrically connected and generally perpendicular to the first vertical busbar.

2. The panelboard of claim 1, further comprising a main input breaker having a first connector for receiving the first phase of electricity, the main input breaker being in the high-amperage section of the housing and coupled to the horizontal busbar such that the first phase of electricity is distributed from the first connector to the horizontal busbar in response to the main input breaker being in an ON position.

3. The panelboard of claim 2, further comprising a secondary input breaker having a second connector for receiving the first phase of electricity, the secondary input breaker being in the high-amperage section of the housing and coupled to the horizontal busbar such that the first phase of electricity is distributed from the second connector to the horizontal busbar in response to the secondary input breaker being in an ON position.

4. The panelboard of claim 3, wherein the secondary input breaker automatically switches to the ON position in response to the main input breaker switching from the ON position to an OFF position.

5. The panelboard of claim 1, further comprising a second vertical busbar, positioned completely within the low-amperage section of the housing, for distributing the first phase of electricity entering the panelboard to a second plurality of low-amperage circuit breakers in the low-amperage section of the housing coupled to the second vertical busbar, the second vertical busbar being generally perpendicular to the horizontal busbar and electrically connected thereto, the first and the second vertical busbars being parallel to a Y-axis and the horizontal busbar being parallel to an X-axis.

6. The panelboard of claim 2, wherein the main input breaker and the plurality of high-amperage circuit breakers are oriented within the housing such that a longest axis of the main input breaker and a longest axis of the plurality of high-amperage circuit breakers are substantially parallel to a Y-axis which is parallel to the first vertical busbar.

7. The panelboard of claim 1, further comprising a jumper bar connected to the vertical busbar and to the horizontal busbar to electrically couple the vertical busbar with the horizontal busbar.

8. The panelboard of claim 2, further comprising a breaker mounting pan coupled to a base of the housing, the breaker mounting pan including a low-amperage section adjacent to and located in the low-amperage section of the housing and the breaker mounting pan further including a high-amperage section adjacent to and located in the high-amperage section of the housing.

9. The panelboard of claim 8, further comprising a first set of attachment points in the high-amperage section of the breaker mounting pan for securing a first type of high-amperage circuit breakers to the breaker mounting pan in the high-amperage section of the housing, and a second set of attachment points in the high-amperage section of the breaker mounting pan further for securing a second type of high-amperage circuit breakers to the breaker mounting pan in the high-amperage section of the housing.

10. The panelboard of claim 8, further comprising a third set of attachment points in the low-amperage section of the breaker mounting pan for securing low-amperage circuit breakers in the low-amperage section of the housing.

11. The panelboard of claim 9, wherein the second set of attachment points is configured for removably securing the main input breaker to the breaker mounting pan in the high-amperage section of the housing.

12. The panelboard of claim 11, wherein a first type of fasteners removably couple the main input breaker and the second type of high-amperage circuit breakers to the high-amperage section of the breaker mounting pan via the second set of attachment points, and a second type of fasteners removably couple the first type of high-amperage circuit breakers to the high-amperage section of the breaker mounting pan via the first set of attachment points.

13. The panelboard of claim 12, wherein the second set of attachment points is located farther away from the horizontal busbar than the first set of attachment points.

14. A panelboard, comprising:
a housing including a base;
a breaker mounting pan coupled to the base of the housing, the breaker mounting pan including a low-amperage section and a high-amperage section;
a first set of attachment points for removably securing low-amperage circuit breakers in the low-amperage section of the breaker mounting pan, each low-amperage circuit breaker having a respective ampere rating;
a second set of attachment points for removably securing high-amperage circuit breakers in the high-amperage section of the breaker mounting pan, each high-amperage circuit breaker having a respective ampere rating, a ratio of a highest ampere rating of the respective ampere ratings of the high-amperage circuit breakers to a highest ampere rating of the respective ampere ratings of the low-amperage circuit breakers being at least about 8 to 1;
a first vertical busbar, positioned completely within the housing, for distributing a first phase of electricity entering the panelboard to a first plurality of low-amperage circuit breakers coupled to the first vertical busbar and to the low-amperage section of the breaker mounting pan via the first set of attachment points;
a horizontal busbar, positioned completely within the housing, for distributing the first phase of electricity to a plurality of high-amperage circuit breakers coupled to the horizontal busbar and to the high-amperage section of the breaker mounting pan via the second set of attachment points, the horizontal busbar being electrically connected and generally perpendicular to the first vertical busbar; and
a main input breaker having a first connector for receiving the first phase of electricity, the main input breaker being coupled to the high-amperage section of the breaker mounting pan via the second set of attachment points and coupled to the horizontal busbar such that the first phase of electricity is distributed from the first connector to the horizontal busbar in response to the main input breaker being in an ON position.

15. The panelboard of claim 14, wherein the second set of attachment points includes a first plurality of slots for removably securing a first type of high-amperage circuit breakers to the high-amperage section of the breaker mounting pan and a second plurality of slots for removably securing a second type of high-amperage circuit breakers and the main input breaker to the high-amperage section of the breaker mounting pan.

16. The panelboard of claim 14, wherein the low-amperage section of the breaker mounting pan is configured to receive only low-amperage circuit breakers having an ampere rating between about 10 and 100 amps and wherein the high-amperage section of the breaker mounting pan is configured to receive only high-amperage circuit breakers having an ampere rating between about 100 and 1200 amps, the highest ampere rating of the respective ampere ratings of the high-amperage circuit breakers being 1200 amps and the highest ampere rating of the respective ampere ratings of the low-amperage circuit breakers being 100 amps.

17. The panelboard of claim 14, further comprising a secondary input breaker having a second connector for receiving the first phase of electricity, the secondary input breaker being coupled to the high-amperage section of the breaker mounting pan via the second set of attachment points and coupled to the horizontal busbar such that the first phase of electricity is distributed from the second connector to the horizontal busbar in response to the secondary input breaker being in an ON position, wherein the secondary input breaker automatically switches to the ON position in response to the main input breaker switching from the ON position to an OFF position such that the horizontal busbar and the vertical busbar receive a constant flow of electricity.

18. A panelboard, comprising:
a housing including a base, a low-amperage section, and a high-amperage section, the low-amperage section being configured to receive low-amperage circuit breakers having an ampere rating between about 10 and 100 amps, the high-amperage section being configured to receive high-amperage circuit breakers having an ampere rating between about 100 and 1200 amps;
a breaker mounting pan coupled to the base of the housing;
a first set of attachment points and a second set of attachment points in the low-amperage section of the housing for removably securing low-amperage circuit breakers therein;
a third set of attachment points in the high-amperage section of the housing for removably securing high-amperage circuit breakers therein;
a first set of three generally parallel vertical busbars, positioned completely within the housing, for distributing a first phase, a second phase, and a third phase of electricity, respectively, to a first plurality of low-amperage circuit breakers coupled to the first set of vertical busbars and to the first set of attachment points in the low-amperage section of the housing;
a second set of three generally parallel vertical busbars, positioned completely within the housing, for distributing the first phase, the second phase, and the third phase of electricity, respectively, to a second plurality of low-amperage circuit breakers coupled to the second set of vertical busbars and to the second set of attachment points in the low-amperage section of the housing, the second set of vertical busbars being laterally offset from the first set of vertical busbars;

three generally parallel horizontal busbars, positioned completely within the housing, for distributing the first phase, the second phase, and the third phase of electricity, respectively, to a plurality of high-amperage circuit breakers coupled to the three horizontal busbars and to the third set of attachment points in the high-amperage section of the housing, the three horizontal busbars being generally perpendicular to the first set of vertical busbars and the second set of vertical busbars, wherein a first one of the horizontal busbars, for distributing the first phase of electricity, is electrically connected to a first one of the first set of vertical busbars and to a first one of the second set of vertical busbars, wherein a second one of the horizontal busbars, for distributing the second phase of electricity, is electrically connected to a second one of the first set of vertical busbars and to a second one of the second set of vertical busbars, and wherein a third one of the horizontal busbars, for distributing the third phase of electricity, is electrically connected to a third one of the first set of vertical busbars and to a third one of the second set of vertical busbars; and a main input breaker having a first connector for receiving the first phase of electricity, a second connector for receiving the second phase of electricity, and a third connector for receiving the third phase of electricity, the main input breaker being coupled to the third set of attachment points in the high-amperage section of the housing and coupled to the three horizontal busbars such that the first phase, the second phase, and the third phase of electricity are distributed from the first, the second, and the third connectors to the first one of the horizontal busbars, the second one of the horizontal busbars, and the third one of the horizontal busbars, respectively, in response to the main input breaker being in an ON position.

19. The panelboard of claim 18, wherein the circuit breakers are single-phase circuit breakers, dual-phase circuit breakers, three-phase circuit breakers, or any combination thereof.

20. The panelboard of claim 18, further comprising a secondary input breaker having a fourth connector for receiving the first phase of electricity, a fifth connector for receiving the second phase of electricity, and a sixth connector for receiving the third phase of electricity, the secondary input breaker being coupled to the third set of attachment points in the high-amperage section of the housing and coupled to the horizontal busbars such that the first phase, the second phase, and the third phase of electricity are distributed from the fourth, the fifth, and the sixth connectors to the first one of the horizontal busbars, the second one of the horizontal busbars, and the third one of the horizontal busbars, respectively, in response to the secondary input breaker being in an ON position, wherein the secondary input breaker automatically switches to the ON position in response to the main input breaker switching from the ON position to an OFF position such that the horizontal busbars and the first and the second sets of the vertical busbars receive a constant flow of electricity.

* * * * *